United States Patent [19]

Katoh et al.

[11] Patent Number: 4,967,299
[45] Date of Patent: Oct. 30, 1990

[54] THIN-FILM MAGNETIC HEAD WITH A PLURALITY OF TRANSDUCERS

[75] Inventors: Takahiro Katoh; Tooru Takeura, both of Odawara; Masayoshi Waki; Yoshiki Hagiwara, both of Hadano; Kazuyoshi Adachi, Yugawaramachi, all of Japan

[73] Assignee: Hitachi, Ltd., Tokyo, Japan

[21] Appl. No.: 210,670

[22] Filed: Jun. 23, 1988

[30] Foreign Application Priority Data

Jun. 29, 1987 [JP] Japan ................... 62-159591

[51] Int. Cl.$^5$ .................... G11B 5/265; G11B 5/33
[52] U.S. Cl. ..................... 360/121; 360/129
[58] Field of Search ............ 360/121, 113, 119, 127, 360/128, 129; 29/603

[56] References Cited

U.S. PATENT DOCUMENTS

| | | | |
|---|---|---|---|
| 4,044,392 | 8/1977 | Brock et al. | 360/113 X |
| 4,370,801 | 2/1983 | Roscamp et al. | 29/603 |
| 4,370,802 | 2/1983 | Platter et al. | 29/603 |
| 4,435,900 | 3/1984 | de Wilde | 360/113 X |
| 4,571,651 | 2/1986 | Reid et al. | 360/121 X |

Primary Examiner—David J. Severin
Attorney, Agent, or Firm—Kenyon & Kenyon

[57] ABSTRACT

A thin-film magnetic head has a first ferrite block on which a plurality of transducing elements are aligned on a predetermined surface, and a second ferrite block bonded to the first ferrite block, and has multi-track capabilities in accordance with the transducing elements. Eithr bonding surface of the first and second ferrite block is formed with an insulating film layer, the entire bonding surface is coated with an adhesive or formed with a plurality of recesses to be externally filled with the adhesive, and the adhesive is filled in gaps defined by the recesses and the surface of the opposed ferrite block. Thus, since the bonding portions of the first and second ferrite blocks are distributed over a wide region, the bonding strength can be largely increased, the transducing gap lengths are uniformly maintained, and the transducing element characteristic is not affected by the aging of the adhesive thereby improving the reliability of the magnetic head.

8 Claims, 3 Drawing Sheets

FIG. 4(a)    FIG. 4(b)
FIG. 5
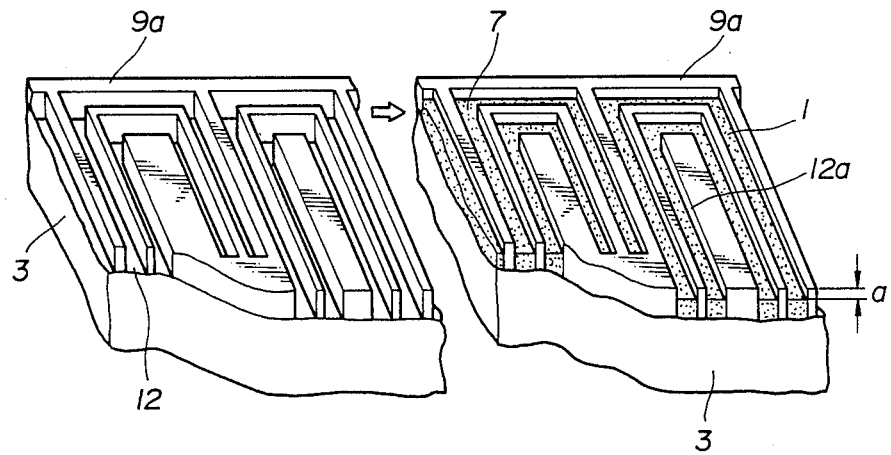
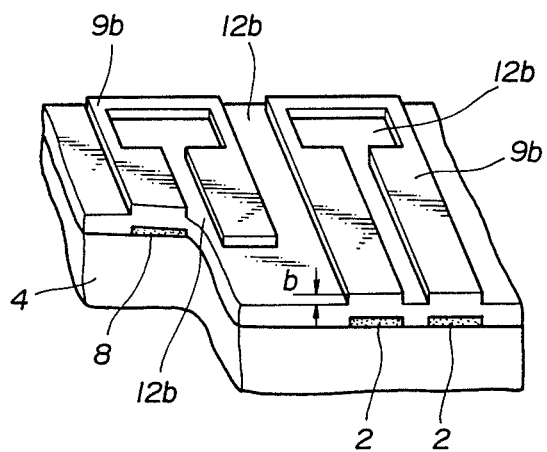

THIN-FILM MAGNETIC HEAD WITH A PLURALITY OF TRANSDUCERS

BACKGROUND OF THE INVENTION

1. Field of the Invention

The present invention relates to a method for manufacturing thin-film magnetic heads having a plurality of conversion elements for use in a magnetic tape transport and a thin-film magnetic head manufactured thereby and, more particularly, to a method for manufacturing thin-film magnetic heads in which the length of transducing gaps of tracks are formed equally with high reliability.

2. Description of the Relevant Art

A thin-film magnetic head having a plurality of transducing elements is formed by forming a plurality of conversion elements by a known thin-film processing technique, such as sputtering, depositing or photoetching on one ferrite block, and fastening another ferrite block, having a surface opposed to the elements to be extremely smoothly finished to one ferrite block, by an adhesive.

In such a thin-film magnetic head manufactured by such a process, the steps of form a plurality of tracks on one magnetic head, and not solely forming transducing gaps corresponding to the tracks but merely bonding two ferrite blocks with an adhesive to simultaneously forming the respective transducing gaps are employed. Thus, the gap lengths of the transducing gaps corresponding to the respective tracks might become irregular after bonding. It is understood that such irregularity of the transducing gaps adversely influences the electromagnetic transducing characteristics of not only the thin-film magnetic head but all the magnetic heads.

For example, a process for making a read-while-write tape head and the magnetic head made thereby are disclosed in U.S. Pat. No. 4,044,392. The magnetic head disclosed in this U.S. Patent is constructed such that a plurality of write elements and a plurality of read elements are aligned on two opposed ferrite blocks and two magnetic layers and a center section sandwiched between the two magnetic layers are disposed between the blocks. Insulating pads made of aluminum oxide are disposed in the vicinity of the right and left ends of the ferrite blocks having the plurality of write elements and at the center of the elements, an insulative gap spacer formed slightly thicker than the elements is disposed on the top of the ferrite block, and the thickness of the spacer determines the write gap dimension, i.e., the transducing gap length. Slots are cut at the sides of the center section opposed to the ferrite blocks having the write elements, filled with glass therein to define write tracks. Such a magnetic head structure is clamped integrally by two bolts through a left end piece and a right end piece. A resulting structure is filled by capillary action with a low viscosity epoxy cement applied to the gap to seal and stabilize the structure. In the method disclosed in this U.S. Patent, when the two ferrite blocks and the center section are assembled, the control of clamping with the two bolts is difficult. If the ferrite blocks and the center section are clamped by a force of certain magnitude so that the insulating gap spacer is uniformly clamped, the transducing gap lengths of the tracks can be theoretically substantially uniformly set. But, since the gaps between the insulative pads and the center section become very short by clamping, the control of raising the bonding strength by supplying sufficient quantity of adhesive into the gaps by the capillary action is difficult. If sufficient quantity of adhesive cannot be fed to the very small gaps between the insulative pads and the center section, the adhesive overflows to the outer region of the surface to be originally bonded, with the result being that the bonding strength is remarkably decreased. The ferrite blocks or the center section are lifted to the medium feeding surface by a stress generated due to the overflowed adhesive aged to be thermally swelled, shrunk or to absorb the moisture in the environment to be swelled, with the result that stepwise differences of micron order might be formed partly on the medium feeding surfaces of the ferrite blocks or the center section. It is apparent that such stepwise differences cause serious defects in case of operating the magnetic head, i.e., recording and reproducing data. For example, if the center section is lifted to the ferrite block on this the elements are formed, the spacing between the medium and the transducing gap is directly affected to remarkably reduce the electromagnetic conversion characteristic. If the center section is pressed down to the ferrite block, the elements formed on the ferrite block are exposed in the vicinity of the medium feeding surface, with the result being that the elements are worn by feeding the recording medium so that the original characteristics cannot be maintained and there is a loss in reliability.

SUMMARY OF THE INVENTION

An object of the present invention is to provide a thin-film magnetic head and a method for manufacturing the same which can eliminate the problems of the prior art and which head can uniformly form the transducing gap lengths of tracks and is not affected by the influence of aging such that there is a change of an adhesive with otherwise high reliability.

Another object of the present invention is to provide a thin-film magnetic head comprising multi-tracks formed of a first ferrite block including a plurality of transducing elements formed on a predetermined surface thereof and a second ferrite block to be bonded to the predetermined surface of the first ferrite block in such a manner that either bonding surface of the first and second ferrite blocks is formed with an insulating film layer, and a plurality of recesses that are coated or externally fed with an adhesive, are formed on any entire bonding surface of the first and second ferrite blocks in such a manner that the adhesive is filled in gaps formed by the recesses between the first and second ferrite block. Thus, since the bonding portions of the first and second ferrite blocks are distributed over wide regions, the bonding strength can be largely increased.

Still another object of the present invention is to provide a method for manufacturing a thin-film magnetic head having a plurality of magnetic transducing elements comprising the steps of forming an insulating film layer on a predetermined surface of a first ferrite block, etching the insulating film layer to form a plurality of grooves so that some of the plurality of grooves are formed in shape corresponding to each magnetic transducing element, forming a magnetic transducing element film having smaller thickness than that of the insulating film layer in the some of the grooves, fitting the second ferrite block to the predetermined surface of the first ferrite block, thereafter filling an adhesive in the recesses defined by the plurality of grooves and the second ferrite block, and then curing the adhesive to bond the first ferrite block to the second ferrite block.

The plurality of grooves formed on the predetermined surface of the first ferrite block are formed such that a first set of grooves is formed with the magnetic transducing elements for these grooves and a second set of remaining grooves, do not have such transducing elements. The adhesive is fed to not only the recesses defined by the grooves formed with the magnetic transducing elements and the second ferrite block but also to the recesses defined by the remaining grooves and the second ferrite block. The adhesive is thereafter cured to bond the first ferrite block to the second ferrite block. Thus, the bonding area can be maintained large with sufficient bonding strength. Therefore, the aging change of the transducing gap lengths corresponding to the magnetic conversion elements of the respective tracks is eliminated to thereby maintain a uniform conversion gap length and provide a high reliability magnetic thin-film head.

The adhesive may be coated on the first set of grooves formed in advance with the magnetic transducing elements and the second set of remaining grooves, the second ferrite block is then fitted to the predetermined surface of the first ferrite block, and the adhesive may be thereafter cured to bond the first ferrite block to the second ferrite block.

Further, the grooves in which the magnetic transducing elements are not formed of the plurality of grooves may be formed by the same forming process as the process for forming the grooves for forming the magnetic transducing elements. The grooves in which no magnetic transducing elements are formed may be also formed on the surface of the second ferrite block opposed to the predetermined surface of the first ferrite block.

The above and other objects of the invention will be apparent by those skilled in the art from a reading of the following detailed description of the disclosure found in the accompanying drawings and novelty thereof pointed out in the appended claims.

BRIEF DESCRIPTION OF THE DRAWINGS

FIG. 4(a) is a partially schematic perspective view showing the surface of a first ferrite block enlarged at a portion of a groove in which a writing element is deposited.

FIG. 4(b) is a partially schematic perspective view showing the surface of a first ferrite block illustrating the state that a wiring element is deposited in the groove of FIG. 4(a).

FIG. 5 is a partially schematic perspective view showing the surface of a second ferrite block illustrating a recess formed on the surface of the second ferrite block, fed with an adhesive thereto, and in which a reading element is deposited.

DETAILED DESCRIPTION OF THE PRESENT INVENTION

Figure 1:
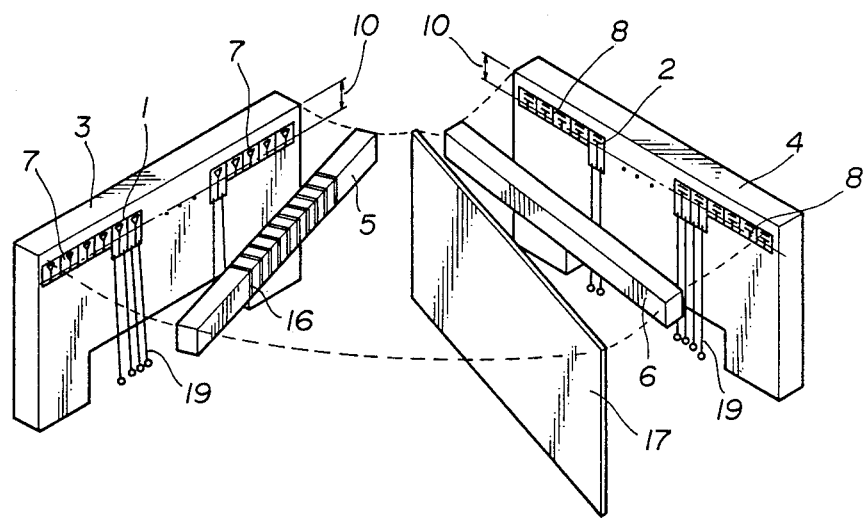
FIG. 1 is a schematic exploded perspective view of an embodiment of a magnetic thin-film head according to the present invention.

An embodiment of a magnetic thin-film head according to the present invention will be described with reference to FIGS. 1 to 6. FIG. 1 shows a schematic structure of a magnetic thin-film head assembly in which a recording magnetic head and a reproducing magnetic head are integrally formed. The recording magnetic head has a magnetic circuit configuration having writing transducing gaps corresponding to writing transducing elements 1 by integrally bonding a first ferrite block 3 including a plurality of writing transducing elements 1 aligned longitudinally (the writing transducing elements 1 are deposited at an extremely smoothly formed center of the first ferrite block 3 formed in a coil shape of a metal material including excellent conductivity, such as gold, copper or aluminum by a thin-film processing technique) with a second ferrite block 5 having a surface which is opposed to the writing transducing elements 1 of the first ferrite block 3 and extremely smoothly formed (a plurality of grooves filled with glass for defining tracks corresponding to the writing transducing elements 1 ar Ⓡformed) by an adhesive. A reproducing magnetic head has a magnetic circuit configuration having reading transducing gaps by integrally bonding a third ferrite block 4 including a plurality of reading transducing elements 2 aligned longitudinally (the reading transducing elements 2 are deposited at an extremely smoothly formed center of the third ferrite block 4 by a thin-film processing technique in a manner similar to that for the writing transducing elements) with a fourth ferrite block 6 including an extremely smoothly formed surface opposed to the reading transducing elements 2 by an adhesive. In the aforementioned recording and reproducing magnetic heads, the surfaces opposed to a recording medium are molded and finished, lead wirings or signal wirings 19 made of a flexible printed substrate are then connected to the transducing element groups to be cOnnected to a device circuit so as to obtain a gap depth to provide an optimum magnetic circuit for holding the preferably contacting state with the recording medium, i.e., magnetic tape. One magnetic head assembly is composed by positioning and fastening a spring or a screw in a housing (not shown) made of aluminum in the state that a magnetic shielding plate 17 for removing noise is interposed between the second ferrite block 5 and the fourth ferrite block 6 of each subassembly constructed as described above.

Figure 2:
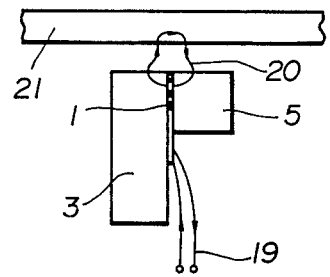
FIGS. 2 and 3 are explanatory views of the writing and reading operations of the magnetic thin-film head.
Figure 3:
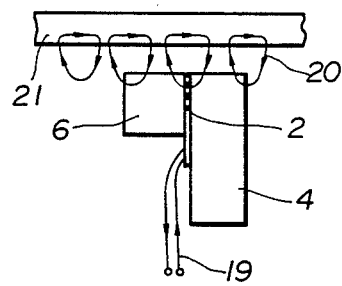
Figure 6:
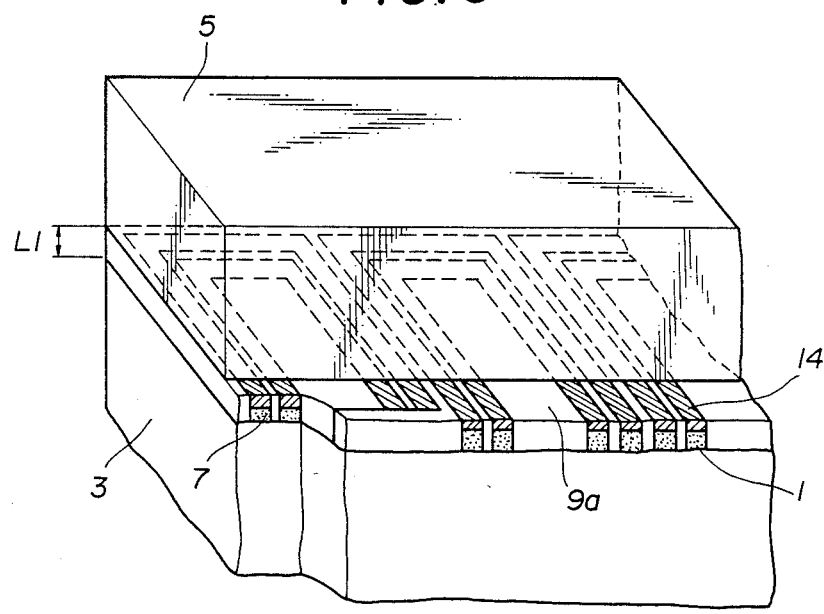
FIG. 6 is a partially schematic perspective view showing the state that a first ferrite block and a second ferrite block are bonded.

The magnetic head is operated to magnetize a medium 21 of FIG. 2 by supplying currents to the writing transducing elements 1 for the recording magnetic head and leaking magnetic fluxes 20 generated thereby from the transducing gaps. The magnetic head is further operated to detect the magnetic fluxes 20 from the medium 21 thus magnetized by the reading transducing elements 2 of the reproducing recording head as a reproducing output. Such an operation is substantially equivalent and accurately functioned at all the transducing elements.

The structure of the magnetic head for stabilizing the aforementioned functions and the method for manufacturing the thin-film magnetic head having such a structure will now be described. After an insulating film layer 9a is formed by a thin-film processing technique, such as by the sputtering of an insulating material, such as aluminum oxide ($Al_2O_3$) or a silicon oxide ($SiO_2$)

along a longitudinal direction on the upper center of the surface of the first ferrite block 3 for forming a recording magnetic head, a plurality of grooves 12 are formed by a milling technique, such as an ion milling on the insulating film layer 9a as shown in FIG. 4(a). Then, a conductive film made of a metal material having excellent conductivity, such as gold, copper or aluminum is formed thinly, such as approx. 0.05 to 5.0 microns by sputtering on the insulating film layer 9a including the grooves 12, the conductive film deposited on a portion of the insulating film layer 9a where the grooves 12 are not formed is then removed by ion milling, a plurality of coil-shaped writing transducing elements 1 are disposed, as shown in FIG. 4(b), along a longitudinal direction on the upper center of the first ferrite block 3, and a plurality of so-called dummy elements 7 which do not form writing transducing elements are disposed along a longitudinal direction on the upper right and left portions of the first ferrite block 3 as shown in FIG. 1. The dummy elements 7 are formed by the same process as the process for forming the writing transducing elements 1, but no signal wirings 19 are connected to elements 7 like the writing transducing elements 1. Accordingly, a plurality of recesses 12a having a depth of approx. 0.5 to 5.0 microns are resultantly formed on the surface of the insulating film 9a for defining the transducing gap length L1 on the first ferrite block 3. This depth is designated by symbol a in FIG. 4(b).

The plurality of reading transducing elements 2 are formed corresponding to the plurality of writing conversion elements 1 by the similar thin-film forming process to that of the writing transducing elements 1 along a longitudinal direction on the upper center of the third ferrite block 4 for forming the reproducing magnetic head, and a plurality of dummy elements 8 which are not connected to the signal wirings are formed on the upper right and left portions as shown in FIG. 1. Further, an insulating film layer 9b for covering the plurality of reading transducing, elements 2 and the dummy elements 8 is formed by a thin film forming process in the same manner as the insulating film layer 9a, with the result that, since the portion, as shown in FIG. 5, where the transducing elements 2 and the dummy elements 8 are formed, is formed in a projection, a plurality of recesses 12b having a depth b corresponding to the thickness of the transducing elements 2 are indispensably formed. Thereafter, it may, of course, vary the area or the shape of the recesses 12b by milling the insulating film layer 9b using a milling technique, such as ion milling so as to obtain an optimum bonding conditions.

The plurality of transducing elements and dummy elements composed in the first and third ferrite blocks 3 and 4 for respectively forming the above-mentioned recording and reproducing magnetic heads are aligned at a uniform interval, and the grooves or the recesses 12a and 12b formed in response to the shapes of the transducing elements and the dummy elements are respectively formed on the predetermined entire regions of the first and third ferrite blocks 3 and 4. In other words, they are formed on the entire bonding areas to the second and fourth ferrite blocks 5 and 6.

In the recording magnetic head, the transducing gap length L is formed by bonding the second ferrite block 5 to the surface of the first ferrite block 3 having the recesses 12a without gap to the insulating film layer 9a while applying a sufficient pressure, e.g., approx. 10 kg. thereto, the recesses 12a are filled with an adhesive 14, and then curing the adhesive to bond the first ferrite block 3 to the second ferrite block 5.

Similarly, in the reproducing magnetic head, the transducing gap length is formed by bonding the fourth ferrite block 6 to the surface of the ferrite block 4, having the recesses 12b without gap to the insulating film layer 9b while applying a sufficient pressure thereto, in the recesses 12b are filled with an adhesive 14, and then curing the adhesive is cured to bond the third ferrite block 4 to the fourth ferrite block 6. In this case, the fact the the depths a and b of the recesses 12a and 12b are approx. 0.05 to 5.0 microns are described before, but it is proper in this range that the adhesive 14 is filled in the recesses 12a and 12b by capillary action.

In addition to the method of filling the adhesive 14 in the recesses 12a and 12b by capillary action after bonding the ferrite blocks while applying pressure thereto, a predetermined quantity of adhesive 14 is coated in advance in predetermined regions including the recesses 12a and 12b, the ferrite blocks may be bonded while applying pressure to the respective blocks to forcibly filling the adhesive remaining on the insulating film layers 9a and 9b in the recesses 12a and 12b. In this method, the overflow amounts of the adhesive from the recesses 12a, and 12b after they are bonded are reduced, and the overflow amounts of the adhesive can be controlled. Thus, a stress caused by the thermal swelling or shrinkage occurring after the overflow adhesive is cured or the swelling of the overflow adhesive due to the absorption of moisture in the external environment can be alleviated. In the abovementioned steps of filling and coating the adhesive, the adhesive, for example, made of epoxy resin, is heated in advance to a predetermined suitable temperature, i.e., a temperature in which the adhesive can has such a viscosity that it can be rapidly spread in the recesses 12a and 12b. The adhesive is further heated to the temperature for curing. It is preferable to bond the ferrite blocks by considering such curing conditions of the adhesive.

After the first ferrite block 3 is bonded to the second ferrite block 5 and the third ferrite block 4 is bonded to the fourth ferrite block 6 as described above, they are contained in a housing as described above in the state that a shielding plate 17 is interposed between the subassemblies to construct one thin-film magnetic head assembly.

In the thin-film magnetic head manufactured by the method as described above, since the steps of contacting the first ferrite block 3 with the second ferrite block 5 and the third ferrite block 4 with the fourth ferrite block 6 at predetermined surfaces thereof with each other while applying suitable pressure thereto are carried out, there is substantially no gap between the insulting film layer 9a and the second ferrite block 5, and between the insulating film layer 9b and the fourth ferrite block 6. Thus, the thickness of the insulating film layer 9a becomes the transducing gap length in the recording magnetic head and the thickness obtained by adding the thickness of the insulating film layer 9b to that of the transducing elements 2 becomes the transducing gap length in the reproducing magnetic head, and the transducing gap lengths can be uniformly formed in both the magnetic heads. Further, since the bonding surfaces of the ferrite blocks of the recording and reproducing magnetic heads are of the entire regions along a longitudinal direction on the tops of the first and third ferrite blocks 3 and 4 as designated by reference numeral 10 and, since the regions to be fed or coated with the adhesive are widely distributed near the medium feeding surface, sufficient bonding strength can be provided.

Figure 7:
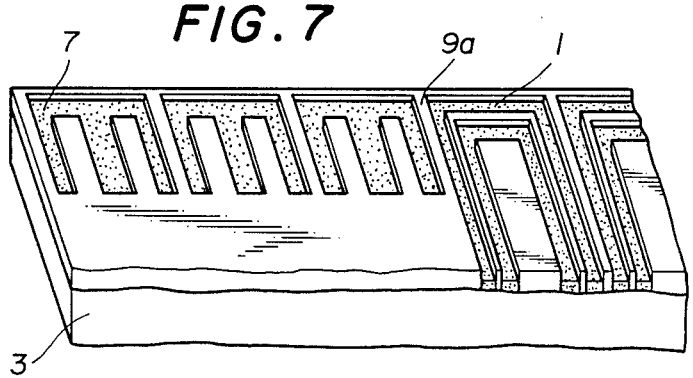
FIGS. 7 and 8 are partially schematic perspective views showing the surface of the first ferrite block of a modified example of a recess to be fed with an adhesive.
Figure 8:
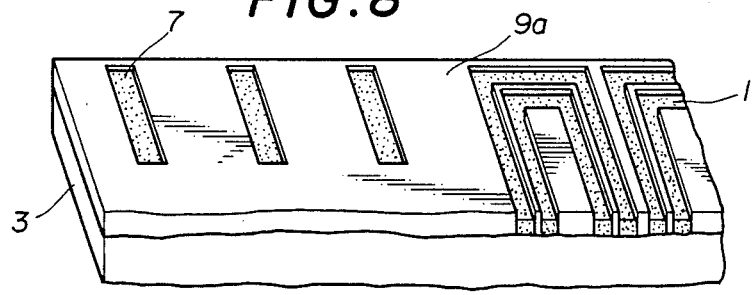

FIGS. 7 and 8 show a modified example of recesses, i.e., grooves to be fed or coated with an adhesive. Grooves formed on the upper right and left portions of the first ferrite block 3 may be different in shape from those formed on the upper center of the first ferrite block 3 on which the transducing elements 1 are deposited. The groves formed on the upper right and left portions of the first ferrite block 3 are formed in the same step as the step of forming the grooves on which the transducing elements 1 are deposited in a pectinated and slender shape separately at a suitable interval, and conductive films having substantially the same thickness as those of the transducing elements 1 are deposited in the grooves. Accordingly, the gaps between the surface of the first ferrite block 3 and the transducing elements 1 are formed in recesses to be fed or coated with an adhesive as shown by reference numerals 12c (FIG. 7) and 12d (FIG. 8).

The grooves may be in a simple shape at an interval of the degree that the grooves are not deformed in the step of associating with the ferrite blocks while applying pressure thereto to be sufficient in a structure that the adhesive is filled in the recesses fed or coated with the adhesive. The present invention is not limited to a particular shape of the grooves. Further, the grooves of the upper right and left portions of the first ferrite block 2 may also be formed in a step different from the step of forming the conversion elements 1.

In the embodiments described above, the recesses fed or coated with the adhesive are formed on the first and third ferrite blocks on which the transducing elements are formed. However, the present invention is not limited to the particular embodiments. For example, the recesses may also be formed on the second and fourth ferrite blocks on which no transducing elements are formed.

In such a configuration the insulating film may be disposed on the second and/or fourth ferrite blocks. Thus, the gaps formed by the recesses of a particular pair (either the first and second or the second and third) or both pair are the product of bringing the respective pair of ferrite blocks together.

What is claimed is:

1. A thin-film magnetic head having multi-track capability comprising:
    a first ferrite block including a plurality of transducing elements formed atop a predetermined surface thereof; and
    a second ferrite block, to be bonded to the predetermined surface of the first ferrite block;
    wherein either bonding surface of the first and second ferrite blocks includes an insulating film layer, and wherein a plurality of recesses, to be coated or externally fed with an adhesive, are formed on any entire bonding surface of the first and second ferrite blocks in such a manner that the adhesive is filled in gaps which are formed by the recesses and an opposing ferrite block surface.

2. The thin-film magnetic head as claimed in claim 1, wherein said plurality of recesses are formed in a shape relative to that of said transducing elements.

3. The thin-film magnetic head as claimed in claim 2, wherein said plurality of transducing elements are deposited on the surface of said first ferrite block, said insulating film layer is so deposited as to cover said plurality of transducing elements, said plurality of recesses being indispensably formed in the insulating film in response to the shapes of said plurality of transducing elements, and the adhesive is filled in said gaps defined by said recesses and said second ferrite block.

4. The thin-film magnetic head as claimed in claim 3, wherein a plurality of other recesses are disposed adjacent to said ones of aid plurality of recesses, and are formed on the right and left regions extended in the aligning direction of said transducing elements.

5. The thin-film magnetic head as claimed in claim 2, wherein said insulating film layer is formed on the surface of said first ferrite block, said plurality of transducing elements are deposited in a plurality of grooves formed on said insulating film layer, and said gaps are defined by ones of said plurality of recesses associated with said transducing elements and the surface of said second ferrite block.

6. The thin-film magnetic head as claimed in claim 5, wherein a plurality of other recesses are disposed adjacent to the ones of said plurality of recesses defined by said plurality of transducing elements on said first ferrite block, being formed on right and left regions extended in an aligning direction of said transducing elements.

7. The thin-film magnetic head as claimed in claim 6, wherein said plurality of other recesses are formed substantially the same as said ones of said plurality of recesses defined by said plurality of transducing elements.

8. The thin-film magnetic head as claimed in any of claims 1 to 7, wherein a depth of each of said plurality of recesses is determined in accordance with a viscosity of the adhesive so that the adhesive can flow in the plurality of recesses by capillary action.

* * * * *

UNITED STATES PATENT AND TRADEMARK OFFICE
CERTIFICATE OF CORRECTION

PATENT NO. : 4,967,299  
DATED : 30 October 1990  
INVENTOR(S) : Takahiro KATO et al.

It is certified that error appears in the above-identified patent and that said Letters Patent is hereby corrected as shown below:

| Column | Line | |
|---|---|---|
| 1 | 25 | Change "form" to --forming--. |
| 1 | 29 | Change "forming" to --form--. |
| 2 | 18 | Change "on this the" to --on which the--. |
| 2 | 65 | Before "some" delete "the". |
| 3 | 39 | After "apparent" change "by" to --to--. |
| 4 | 24 | Change "are formed" to --are formed--. |
| 4 | 40 | Change cOnnected" to --connected--. |
| 5 | 51 | Change "conditions" to --condition--. |
| 5 | 68 | Change "12aare" to --12a are--. |
| 6 | 5 | After "block 4" delete the comma. |
| 6 | 6 | After "12b" insert --,--. |
| 6 | 7 | After "9b" insert --,--; after "thereto" delete ", in" and insert --.--. |
| 6 | 8 | Change "the recesses 12bare" to --The recesses 12b are--. |
| 6 | 9 | Delete "curing". |
| 6 | 22 | Change "filling" to --fill--. |
| 7 | 45 | Change "pair" to --pairs--. |
| 7 | 46 | Change "pair" to --pairs--. |

UNITED STATES PATENT AND TRADEMARK OFFICE
CERTIFICATE OF CORRECTION

PATENT NO. : 4,967,299

DATED : 10/ 30/ 90

INVENTOR(S) : Takahiro Kato et al

It is certified that error appears in the above-identified patent and that said Letters Patent is hereby corrected as shown below:

| Column | Line | |
| --- | --- | --- |
| 8 | 25 | Change "aid" to --said--. |

Signed and Sealed this

Fourteenth Day of July, 1992

*Attest:*

DOUGLAS B. COMER

*Attesting Officer* — *Acting Commissioner of Patents and Trademarks*